Patented Aug. 13, 1935

2,011,307

UNITED STATES PATENT OFFICE 2,011,307

PROCESS FOR THE MANUFACTURE OF SULPHATES OF AMMONIA

Adrianus Johannes van Peski, Amsterdam, Netherlands, assignor, by mesne assignments, to Shell Development Company, San Francisco, Calif., a corporation of Delaware No Drawing. Application October 23, 1930, Serial No. 490,822. In Great Britain October 25, 1929

2 Claims. (Cl. 23—119)

My invention relates to the manufacture of sulphates of ammonia e. g. ammonium sulphate or ammonium bisulphate, by subjecting gaseous mixtures, aqueous solutions or solid compounds, which contain or are composed of ammonia and sulphur dioxide to an oxidizing action either in the presence or absence of water or water vapour.

Many processes have been described for the conversion of ammonium sulphite into ammonium sulphate, which latter substance is a valuable constituent of artificial manure.

In general these processes consist in treating a solution of ammonium sulphite with oxygen or air or with other oxidizing gases, so that a solution of ammonium sulphate is formed, which thereafter is concentrated in order to separate out the ammonium sulphate in solid form.

Attempts have been made to oxidize ammonium sulphite in solid form by treating it with oxygen-containing gases, but the yield of ammonium sulphate has been relatively small.

I have now found that the oxidation of compounds containing the components $NH_3$ and $SO_2$, for instance ammonium sulphite or ammonium bisulphite, whether in the solid phase or in aqueous solutions, is considerably improved if the oxidation is performed with the aid of oxygen or oxygen-containing gases in the presence of one or more nitrogen oxides or substances which yield nitrogen oxides under the conditions of the process. For the purpose of this invention the term "nitrogen oxide" is to be regarded as excluding nitrous oxide.

I have also found that the manufacture of sulphates of ammonia direct from gaseous ammonia, sulphur dioxide, water or water vapour and oxidizing gases, is considerably facilitated by the presence of said nitrogen oxide or oxides or other substances yielding these oxides under the conditions of the reaction.

I have found, that the last mentioned method can advantageously be carried out by conducting gaseous ammonia, sulphur dioxide and oxidizing gases into water.

According to the invention, the oxidation is preferably carried out at an elevated temperature, in the presence or absence of substances promoting the desired oxidation. Sometimes it is advantageous to perform the reaction at increased or at reduced pressure.

As oxidizing gases, air or oxygen or other oxygen-containing gases or gas mixtures may be employed.

The initial materials as well as the nitrogen oxides may be of any convenient origin.

The nitrogen oxides should preferably be mixed with the oxygen-containing gases before they come into contact with the substances or mixtures of substances to be oxidized.

The oxidation of solid ammonium sulphite or other solid compounds containing the components $NH_3$ and $SO_2$, such as ammonium bisulphite, may be readily carried out, according to the invention, by passing a mixture of air and nitrogen peroxide through the substance to be oxidized, which is introduced into a tube heated to a temperature of, for example 80° C. In order to promote efficient contact between the oxidizing medium and the substance to be oxidized the latter may be stirred or kept moving in any suitable manner.

The outflowing gases, if necessary, enriched with oxygen and nitrogen peroxide, may be again conducted through a fresh quantity of substance to be oxidized.

Advantageously the mass to be oxidized may be treated several times with the nitrogen peroxide-containing oxidizing medium, in order to convert the total quantity of ammonium sulphite into ammonium sulphate.

As stated above the nitrogen oxides or the substances which yield nitrogen oxides under the conditions of the reaction also catalyze the reaction between ammonium sulphite or ammonium bisulphite in aqueous solutions and oxygen or oxygen-containing gases.

An aqueous solution of ammonium sulphite or ammonium bisulphite may be advantageously prepared by introducing roast gases, which besides sulphur dioxide contain a large percentage of nitrogen originating from the air used for the oxidation into water, whilst gaseous ammonia is simultaneously blown into the water. The nitrogen escapes from the solution without carrying along with it the ammonium sulphite, as is the case when preparing ammonium sulphite in the vapour phase.

The ammonium sulphite solution obtained in this way can be converted into a solution of ammonium sulphate with the aid of oxygen or oxygen-containing gases and in the presence of nitrogen oxides.

As mentioned above, it is also possible to perform the oxidation of the ammonium sulphite simultaneously with its formation.

The following examples illustrate how the process of the invention may be carried into effect:

1. 40 grams of a mixture of 77.8 parts of ammonium sulphite and 22.2 parts of ammonium sulphate is brought into a tube. During one and a half hours and at a temperature of 80° C. $NO_2$- containing air is passed over the mixture at a rate of 500 cubic centimetres per minute. The mass treated in this manner was found to obtain 18.3% of sulphite and 81.7% of sulphate.

On subjecting the treated mass to a second oxidation the total conversion of the sulphite into sulphate can be effected.

2. Equal volumes of sulphur dioxide and ammonia are introduced into 2.5 litres of water until a 10% ammonium bisulphite solution has been formed. Into said solution, air mixed with nitric oxide (NO) is blown, until its content of sulphur dioxide is very small (the content may be determined volumetrically). Thereafter sulphur dioxide and ammonia in the same proportions by volume are introduced into the solution, after which a further oxidation is effected by means of air mixed with nitric oxide. These treatments are repeated until the desired concentration of ammonium bisulphate is attained.

An important advantage of the above-mentioned manner of carrying out the process of the invention is that the oxidation capacity, calculated in tons of sulphate per cubic metre of apparatus per day, is much greater than that of the lead chamber process. Thus a more rapid reaction in a smaller apparatus gives the same result as the usual method of preparing ammonium sulphate.

As examples of substances which, in the described solutions, yield nitrogen oxides, the salts of nitrohydroxylaminic acid may be mentioned, which salts, when treated with mineral acids, give nitric oxide.

3. Ammonia, sulphur dioxide, water and air mixed with nitric oxide, are simultaneously introduced into a vessel, the interior of which is kept at approximately 80° C. The velocity with which the gaseous ammonia is introduced amounts to approximately 4 litres per minute, that of the sulphur dioxide to approximately 2 litres per minute and that of the air mixed with nitric oxide to approximately 8 litres per minute. Simultaneously, approximately 2 cubic centimetres of water per minute are introduced in a finely divided state.

The product of the reaction is removed from the apparatus in a continuous manner. It is composed of nearly pure ammonium sulphate, which may be converted into 100% ammonium sulphate by treating it with air mixed with nitric oxide at a temperature of approximately 80° C.

Hitherto the manufacture of ammonium sulphate by oxidation in the gaseous phase could only be effected by making special provisions and by carefully regulating the quantities of the reacting components, so that from a technical point of view the process was difficult to carry into effect.

It is an important advantage of the present process that when performing the oxidation in the gaseous phase, for instance as illustrated in the above example, these difficulties are completely overcome.

The reacting components may, if necessary or desirable, be employed in diluted condition, i. e. mixed with other gases or vapours. Thus according to the invention it is possible to use sulphur dioxide, diluted with other gases or vapours, such as may be obtained by various processes in which sulphur dioxide is formed together with other gases. Thus, for example, sulphur-containing gases or vapours, such as coke gas, or sulphur-containing mineral oils or products therefrom, may be desulphurized in known manner by conducting the same in vapour form over a suitable contact substance, such as nickel and the like, whereafter the contact substance is regenerated with hydrogen, causing the sulphur to combine with the hydrogen and thereby forming sulphuretted hydrogen. The latter may then be oxidized in the presence of a catalyst, whereby sulphur dioxide mixed with other gases or vapours is formed, which mixture may be used directly for the manufacture of ammonium sulphate in the manner described above.

The reaction in the gaseous phase may be performed in a vessel of any convenient shape and size, if desired under elevated pressure. Ammonia, water vapour and sulphur dioxide may be blown into the vessel through separate tubes; in addition air may be blown through these tubes or alternatively the air may be previously mixed with the sulphur dioxide. The air may also be blown in at the end point of the passage of the sulphate in the apparatus, from which point it is forced in a direction opposite to that of the stream of the other components. The nitrogen oxides may be previously mixed with the oxidizing air.

It is particularly advantageous to carry out the oxidation in a medium consisting of a totally or practically totally saturated aqueous solution of ammonium sulphate, e. g. by introducing the ammonia, sulphur dioxide and air together with a small amount of nitrous vapours as catalyst into a concentrated ammonium sulphate solution.

4. 2.5 litres of pure water are introduced into a suitable reaction vessel filled with so-called Raschig-rings. Thereafter air, sulphur dioxide containing 5% by volume of nitric oxide (NO), and ammonia are introduced into the water separately but simultaneously. The velocity with which the sulphur dioxide is introduced amounts approximately to 300 ccs. per minute, that of the ammonia to approximately 600 ccs. per minute; these velocities are regulated in such a way that an excess of sulphur dioxide is present throughout.

Raschig-rings constitute a well-known and widely used filling material for washing-towers, reaction chambers, fractionation columns, etc. The outer diameter of the rings is approximately equal to the height (rings of 25 mm. high are mostly employed). Raschig-rings are generally made of metals, e. g. iron, but also rings of ceramic material are being used.

The temperature of the solution gradually increases to approximately 60° C., which has a favourable effect on the conversion velocity. From the gases withdrawn the nitrogen oxides are recovered in any suitable known way.

The process according to the invention can be carried into effect with very small quantities of nitrogen oxide. Moreover it is an important feature thereof, that even in an ammoniacal medium the nitrogen oxide acts as a catalyst of the oxidation, before a formation of nitrite, which itself has no catalytic influence on the oxidation, has taken place. The following experiments illustrate this feature.

5. To 100 cc. of a solution containing a quantity of ammonium sulphite equivalent to 0.1745 gram molecules of $SO_2$ 12 cc. of strong ammonia are added, the resulting liquid being 1.5 normal with respect to free ammonia. Into this solution oxygen, containing ⅛ per cent by volume of nitrogen peroxide is introduced at a velocity of 36 litres per hour and at a temperature of 60° C. After 40 minutes the quantity of the unoxidized sulphite was found to amount to only 0.0068 gram molecules. As the 24 litres of oxygen introduced into the solution contained 30 cc. of $NO_2$, the quantity of sulphite oxidized per molecule of $NO_2$ is 136 molecules.

6. To 100 cc. of an ammonium sulphite solution containing 0.1741 gram molecules of combined $SO_2$, 10 cc. of 0.5 normal sulphuric acid are added. Thereafter oxygen, containing ⅛ per cent by volume of $NO_2$, is passed through the solution at a temperature of 60° C. and at a velocity of 36 litres per hour. After 35 minutes only 0.0026 gram molecules of $SO_2$ remained unoxidized. The 21 litres of oxygen, introduced into the solution contained 26 cc. of $NO_2$, the quantity of sulphite oxidized per molecule of $NO_2$ being 160 molecules.

What I claim is:

1. Process for the manufacture of sulfates of ammonia comprising forming a 10% ammonium bi-sulphite solution by passing ammonia and sulfur dioxide into water, introducing an air-nitric oxide gas mixture into said solution until the sulfur dioxide content is substantially reduced, thereafter alternately introducing sulfurdioxide simultaneously with ammonia and air-nitric oxide mixture whereby a desired concentration of ammonium sulfates is formed.

2. Process for the manufacture of sulfates of ammonia comprising forming a 10% solution of ammonium bi-sulfate in water, thereafter introducing an air-nitric oxide gas mixture into said solution whereby sulfates of ammonia are formed.

ADRIANUS JOHANNES VAN PESKI.